United States Patent [19]
Naughton et al.

[11] Patent Number: 5,519,825
[45] Date of Patent: May 21, 1996

[54] METHOD AND APPARATUS FOR NTSC DISPLAY OF FULL RANGE ANIMATION

[75] Inventors: Patrick J. Naughton, Palo Alto; James A. Gosling, Woodside, both of Calif.

[73] Assignee: Sun Microsystems, Inc., Mountain View, Calif.

[21] Appl. No.: 153,219

[22] Filed: Nov. 16, 1993

[51] Int. Cl.$^6$ .................................................. G06F 13/00
[52] U.S. Cl. ............................................................ 395/152
[58] Field of Search ................................ 395/152, 153, 395/154; 434/118; 345/113, 114, 122

[56] References Cited

U.S. PATENT DOCUMENTS

| | | | |
|---|---|---|---|
| 4,414,628 | 11/1983 | Ahuja et al. | 395/158 |
| 4,951,038 | 8/1990 | Yamamura | 345/122 |
| 5,001,469 | 3/1991 | Pappas et al. | 345/120 |
| 5,043,923 | 8/1991 | Joy et al. | 395/164 |
| 5,111,409 | 5/1992 | Crosby | 395/152 |
| 5,113,493 | 5/1992 | Gasper et al. | 395/152 |
| 5,150,312 | 9/1992 | Beitel et al. | 395/118 |
| 5,164,716 | 11/1992 | Taylor et al. | 345/201 |
| 5,315,692 | 5/1994 | Hansen et al. | 395/119 |
| 5,394,523 | 2/1995 | Harris | 395/162 |
| 5,411,272 | 5/1995 | Naka et al. | 273/437 |
| 5,416,497 | 5/1995 | Nishi et al. | 345/122 |

FOREIGN PATENT DOCUMENTS

| | | |
|---|---|---|
| 0284904 | 3/1988 | European Pat. Off. . |
| 0497344 | 1/1992 | European Pat. Off. . |

*Primary Examiner*—Heather R. Herndon
*Assistant Examiner*—Jody R. Wingard
*Attorney, Agent, or Firm*—Irell & Manella

[57] ABSTRACT

Full-motion animation video is displayed in a computer system through use of sprite objects. The sprite objects define the images on the output display, and the locations of the sprite objects are changed to create the animation. The computer system includes three areas of physical memory assigned the status of a front buffer, a back buffer, and a cache buffer. The front buffer stores a frame currently displayed on the output display. The cache buffer is utilized to store a subset of the sprite objects so that all sprite objects need not be rendered for each frame of animation. The contents of the cache buffer are copied to the back buffer during display of the front buffer. To display a subsequent frame, the front and back buffers are switched. A cache buffer permits display of full-motion animation by minimizing use of processor and computer resources.

10 Claims, 11 Drawing Sheets

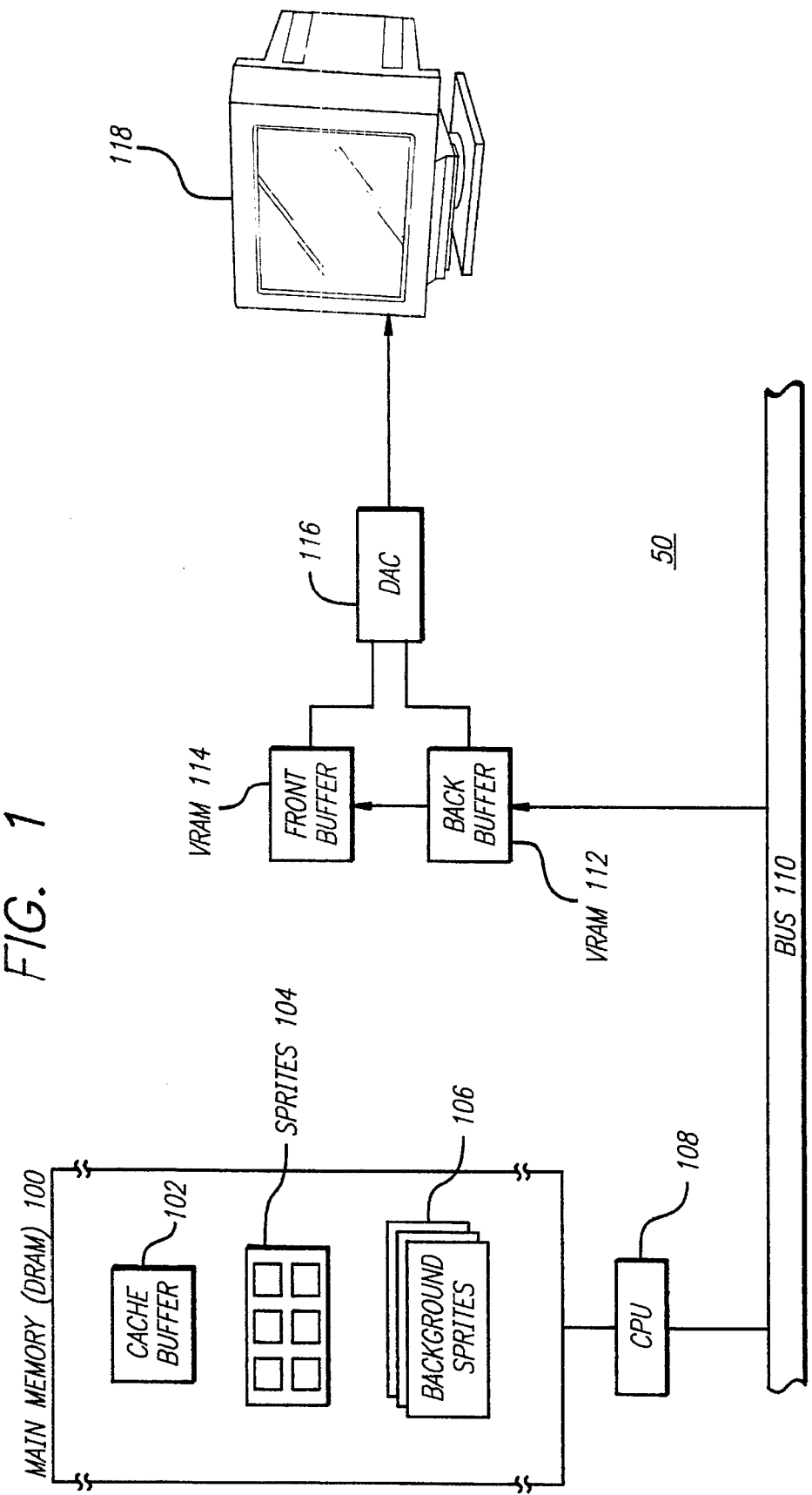

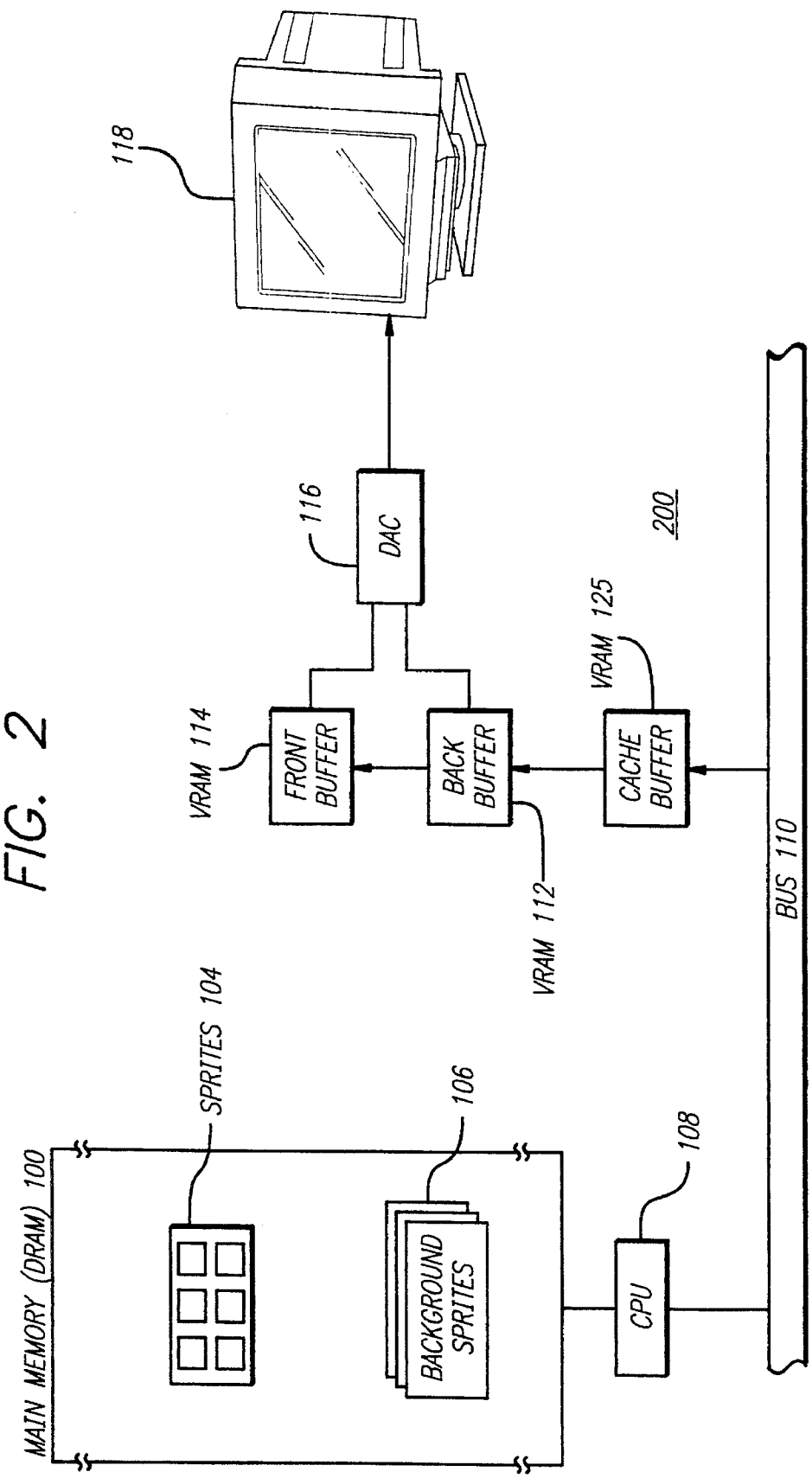

METHOD AND APPARATUS FOR NTSC DISPLAY OF FULL RANGE ANIMATION

BACKGROUND OF THE INVENTION

1. Field of the Invention

The present invention relates to data processing in a computer system, and more specifically to methods and apparatus for display of full-motion animation.

2. Art Background

Many computer systems use a region of memory called a frame buffer for storing pixel data for display on a graphics output display device. In order to display the pixel data stored in the frame buffer, a display control system reads the pixel data in the frame buffer line-by-line, converts the data into an analog video signal using a digital to analog converter (DAC), and transmits the analog video signal to the output display device. The line-by-line scanning generally begins at a region in the frame buffer corresponding to the upper left-hand corner of the display screen and continues to the lower right-hand corner.

Typically, a frame buffer is constructed of video random access memory (VRAM) devices. The VRAM devices differ from conventional dynamic random access memory (DRAM) devices because the VRAM devices contain two access ports wherein the DRAM devices typically contain one port. A first access port, called a random access port, provides conventional random access to the VRAM such that a central processing unit (CPU) coupled to the VRAM may read or write to any memory location in the VRAM. A second port, called a serial access port, provides simultaneous serial access to the VRAM such that a device coupled to the serial port can shift data in or out of the VRAM. A display circuit usually accesses the serial port to furnish pixel data to the circuitry controlling the output display. In such a configuration, the CPU can write to the VRAM while a display circuit continually furnishes pixel data to an output display.

Animation sequences are often created in computer systems that couple a display screen to this type of frame buffer based display system. When creating an animation sequence within such a configuration, animation software renders a series of frames in which each frame's image changes slightly. To provide smooth animation, approximately 15 to 30 new frames are displayed each second. As the first frame image changes to the next frame image, the effect of continuous motion is created. Therefore, to create a full-motion animation sequence, the frame buffer is continually updated.

The ability of a frame buffer to both receive pixel data and transfer the pixel data to an output display simultaneously causes certain difficulties. If the animation software writes to the frame buffer memory while the display controller is scanning the image in the frame buffer memory, then the output display may simultaneously display a graphic image from multiple animation frames. The display of improper pixel data from more than one animation frame is referred to as a "frame tear". Frame tears are particularly apparent where motion from one frame to the next causes distortion in the graphic image presented on the display.

To eliminate frame tears, certain computer systems utilize a double buffering display system. The double buffered display system provides two regions of memory in the frame buffer wherein each region of memory stores pixel data to the DAC circuitry. A first region of memory provides a first animation frame to the output display such that the first region of memory is not updated during scanning for output to the display screen. While the first memory region is displayed on the display screen, animation software renders the next animation frame in the second region of memory. After the animation software completes the next animation frame, the DAC is switched such that the second region of memory becomes the displayed frame and the first region of memory becomes the "work" region. The animation software renders the next animation frame in the work region of memory. Consequently, frame tears are eliminated in a double buffered display system because pixel data is not written to the region of memory that is currently supplying pixel data to the display screen.

When computer systems utilize a double buffered display system to create animation sequences, the CPU generates every scene in the work region for each new frame of animation in the animation sequence. The animation scenes may comprise both a background scene and animated objects. If the animated objects are being rendered on top of the background scene, the entire background scene must be generated by the CPU before it can render the animated objects. To provide high-quality real time animation, the rendering of the background and the animated objects for an animation frame must be done approximately 15 to 30 times per second.

Full-motion animation on a NTSC-resolution frame buffer requires updating approximately 345,600 pixels per frame based on the dimensions of a full NTSC-resolution frame buffer. Each frame of animation is a single screen, consisting of 345,600 pixels (720×480). Thus, in order to display full-motion animation at 30 frames per second, 10.368 million pixels per second (720×480×30) must be copied to the frame buffer. A modest integer reduced instruction set computer (RISC) CPU executes 10 million instructions per second (MIPS). For such a RISC CPU, approximately 1 instruction is available to paint each pixel (10 MIPS/10m pixels) in order to display full-motion NTSC-resolution animation. Moreover, the calculation of how many instructions are available per pixel does not take into account the multiple layers of image data that may need to be written in order to generate several semi-transparent images together to form the final image for each frame. This type of animation is not possible without special hardware. Therefore, it is desirable to generate full-motion NTSC-resolution animation without the use of specialized computer hardware. The present invention allows for full-motion, NTSC-resolution, 30 frames per second animation without special hardware.

SUMMARY OF THE INVENTION

The present invention displays full-motion animation video at the rate of 30 frames per second through use of sprite objects and without utilizing special output display hardware. Each sprite object contains a horizontal (X), vertical (Y), and depth (Z) attribute to map the sprite object to a location on the output display. For each frame of an animation sequence, a sprite list, containing a set of sprite objects defining the corresponding animation frame, is generated. To render the animation, the X, Y or Z attributes of the sprite objects in the sprite list are changed.

To implement full-motion animation, a computer system contains a main memory coupled to a central processing unit (CPU). The computer system includes three areas of physical memory arbitrarily and dynamically assigned the status of a front buffer, a back buffer, and a cache buffer. The front buffer, back buffer, and cache buffer each contain identically sized rasters to match the capacity of the resolution depth color of a corresponding output display. The back and front buffers are coupled to a video digital to analog converter (DAC), and the video DAC is connected to an output display. To display a frame of the full-motion animation video, the CPU programs the DAC to select either the front buffer or the back buffer.

In order to initialize the cache and back buffers, an initial frame for the animation sequence is painted in the cache buffer, and subsequently copied into the back buffer. The front and back buffers are switched to display the first frame. To generate a second frame, the sprite objects in the first frame are compared with the sprite objects on the second frame to determine whether any sprite objects have moved. All sprite objects that have not moved prior to encountering a sprite object that has moved are painted to the cache buffer. A cache limit is set to identify the sprite objects stored in the cache buffer. The cache buffer is then copied to the back buffer, and the back and front buffers are switched to display the second frame.

For each subsequent frame, the sprite objects for the current frame are compared with the sprite objects of the previous frame to determine whether any sprite objects have moved. When a changed sprite object is detected and the contents of the cache buffer are valid, then the cache buffer is copied to the back buffer, and the changed sprite objects are painted into the back buffer. Alternatively, when a changed sprite object is detected and the contents of the cache buffer are not valid, then the cache buffer is repainted and copied to the back buffer. The changed sprite objects are painted into the back buffer, and the front and back buffers are switched.

BRIEF DESCRIPTION OF THE DRAWINGS

The objects, features, and advantages of the present invention will be apparent from the following detailed description of the preferred embodiment of the invention with references to the following drawings.

FIG. 1 illustrates a block diagram of a computer system configured in accordance with a first embodiment of the present invention.

FIG. 2 illustrates a block diagram of a computer system configured in accordance with a second embodiment of the present invention.

NOTION AND NOMENCLATURE

Figure 3A:
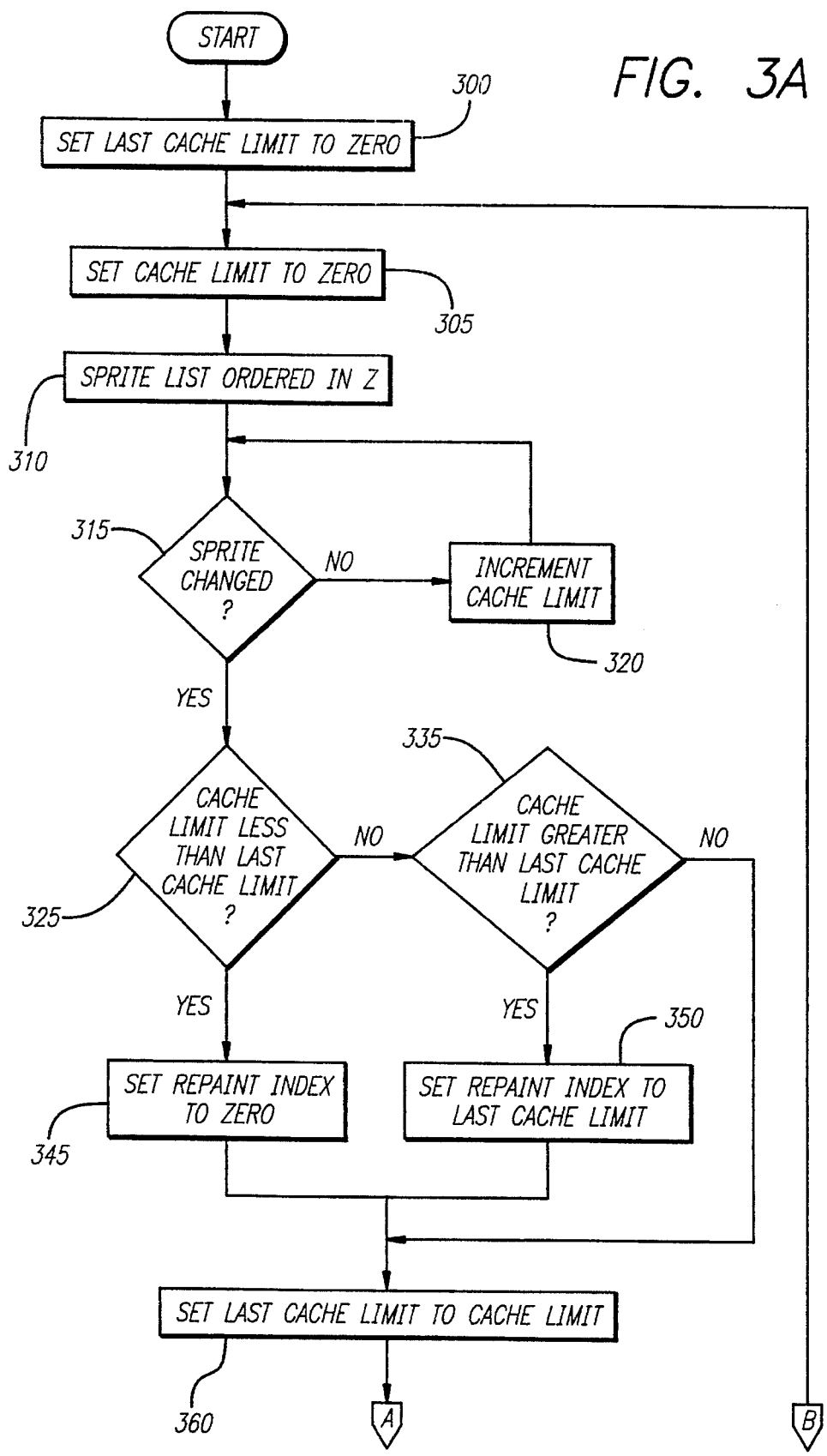
FIGS. 3a–3b illustrate a flow diagram of a method for full-motion animation configured in accordance with the present invention.

The detailed descriptions which follow are presented largely in terms of algorithms and symbolic representations of operations within a computer system. These algorithmic descriptions and representations are the means used by those skilled in the data processing arts to most effectively convey the substance of their work to others skilled in the art.

Within the context of this application, and generally, an algorithm is conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar devices. In all cases, a distinction is maintained between the method operations in operating a computer and the method of computation itself. The present invention relates to method steps for operating a computer in processing electrical or other (e.g., mechanical, chemical) physical signals to generate other desired physical signals.

The present invention also relates to apparatus for performing these operations. This apparatus may be specially constructed for the required purposes, or it may comprise a general purpose computer as selectively activated or reconfigured by a computer program stored in the computer. The algorithms presented herein are not inherently related to a particular computer or other apparatus. In particular, various general purpose machines may be used with programs written in accordance with the teachings herein, or it may prove more convenient to construct more specialized apparatus to perform the required method steps. The required structure for a variety of these machines will appear from the description given below. Machines which may perform the functions of the present invention include those manufactured by FirstPerson, Inc., as well as other manufacturers of computer systems.

DETAILED DESCRIPTION OF THE INVENTION

Methods and apparatus for full-motion real-time animation are disclosed. In the following description, for purposes of explanation, specific nomenclature is set forth to provide a thorough understanding of the present invention. However, it will be apparent to one skilled in the art that these specific details are not required to practice the present invention. In other instances, well known circuits and devices are shown in block diagram form to avoid obscuring the present invention unnecessarily.

The methods and apparatus of the present invention permit display of real-time full-motion animation. In a preferred embodiment of the present invention, full-motion animation is generated and displayed in the National Television Standard Committee (NTSC) video format. However, the methods and apparatus of the present invention equally apply to animation sequences generated in the red, green, blue (RGB) and monochrome video formats. In addition, the methods and apparatus of the present invention are applicable to animation sequences generated in a high definition television (HDTV) format. However, animation sequences conforming to the NTSC video format permit direct interfacing with existing television formats. As will be described more fully below, the present invention displays full-motion NTSC resolution animated video at the rate of 30 frames per second without utilizing special output display hardware.

The present invention generates sprite objects for use in displaying full-motion animation. In some video game applications, sprites are utilized in hardware based animation techniques. The number of hardware sprites that can be used in hardware animation techniques is limited, and therefore display of animation sequences is also limited. Also, hardware sprites are limited to fixed register sizes such that all sprites contain the same number of pixels. In the present invention, sprite objects are defined as graphical images that are stored in memory and used to generate full-motion animation. The sprite objects of the present invention are not limited to a particular output display size, and each sprite object may comprise a different pixel resolution. For example, a sprite object containing a background image, may comprise a size consisting of an entire screen of pixels.

Each sprite object contains a horizontal (X), vertical (Y), and depth (Z) attribute to map the sprite object to a location on the output display. The X and Y attributes for each sprite object define the horizontal and vertical output display locations, respectively. The Z attribute defines the stacking order or depth dimension for the particular sprite object. For purposes of explanation and convention, sprite objects having a lower Z attribute value are displayed on top of other sprites having a higher Z attribute value. For each frame of an animation sequence, the present invention generates a sprite list. The sprite list contains a set of sprite objects that defines the corresponding animation frame. To generate a typical animation sequence, a number of sprite objects, containing background images, are displayed. In addition to displaying the sprite objects containing the background images, sprite objects defining characters or target objects for the animation sequence are displayed. Typically, the character sprite objects are displayed in the foreground of the animation frame. To generate the animation, the X, Y or Z attributes of the sprite objects are changed. Consequently, the sprite objects move or change location to create the full-motion animation. The use of sprite lists, including ordering of sprite objects based on Z attributes, is described more fully below.

Referring to FIG. 1, a block diagram of a computer system configured in accordance with a first embodiment of the present invention is illustrated. To implement full-motion animation, a computer system 50 contains a main memory 100. Preferably, the main memory 100 consists of dynamic random access memory (DRAM). The main memory 100 is coupled to a central processing unit (CPU) 108 and, in turn, the CPU 108 is coupled to a bus 110. The main memory 100 contains storage locations for general operation of the computer system 50. In addition, the main memory 100 contains storage locations to generate the full-motion animation of the present invention. The main memory 100 contains, in part, a cache buffer 102, sprite objects 104, and sprite objects containing background sprites 106. The cache buffer, the sprite objects 104, and background sprites 106 may reside at any location within main memory 100. The computer system 50 includes three areas of physical memory arbitrarily and dynamically assigned the status of a front buffer, a back buffer, and a cache buffer. The front buffer, back buffer, and cache buffer each contain identically sized rasters to match the capacity of the resolution depth color of a corresponding output display. The back buffer 112 and front buffer 114 are implemented with video random access memory (VRAM). The back and front buffers 112 and 114 are coupled to a video digital to analog converter (DAC) 116. The video DAC 116 is connected to an output display 118.

The front and back buffers 114 and 112 operate as frame buffers for the computer system 50. The front and back buffers 114 and 112 store a series of scan lines that represent an image for display on output display 118. The video DAC 116 scans either the front buffer 114 or back buffer 112, line by line, converts the pixel scan lines to an analog format, and drives the raster output display 118 to display an associated scan line. The output display 118 may comprise a cathode ray tube (CRT) or a liquid crystal display (LCD) output display. A pixel, or picture element, is a single colored dot illuminated on the output display 118, and is represented in the frame buffer by an arbitrary number. For example, a 24 bit pixel may comprise 8 bits of red, green, and blue. A 16 bit pixel may comprise 5 bits of red, 6 bits of green, and 5 bits of blue. In addition to pixels, the computer system also stores alphas. An alpha is a fixed point fractional number that represents the opacity of each pixel and may be stored in a separate physical memory having a one-to-one correspondence with the associated pixel data. Alternatively, alpha values may be packed into each word in the physical frame buffer that contains the pixel data. Any format for storing pixels can be used in conjunction with the generation of the full-motion animation without deviating from the spirit and scope of the present invention.

To display a frame of the full-motion animation video, the CPU 108 programs the DAC 116 to select either the front buffer 114 or the back buffer 112. The CPU 108 selects the front and back buffers 114 and 112 in an alternative manner. For purposes of explanation, the VRAM currently selected to supply pixel data is entitled the front buffer, and the VRAM not currently selected to supply pixel data is entitled the back buffer. Using this convention, the front buffer alternates from the VRAM 114 and the VRAM 112 for each frame displayed on the output display 118. The operation of the VRAM with a corresponding DAC and output raster display is well-known in the art and will not be described further.

Referring to FIG. 2, a block diagram of a computer system configured in accordance with a second embodiment of the present invention is illustrated. The computer system 200 is configured similar to the computer system 50 illustrated in FIG. 1 except for the arrangement of the cache buffer. In the computer system 200, the cache buffer 125 is implemented with a VRAM. By utilizing a VRAM for the cache buffer as shown in FIG. 2, data transferred from the cache buffer 125 to the back buffer 112 is optimized. An optimized copy operation for the cache buffer 125 to the back buffer VRAM 112 is described more fully below.

Referring to FIG. 3a, a flow diagram illustrating a method for full-motion animation configured in accordance with the present invention is shown. To display full-motion animation video, sprite objects 104 and background sprites 106 are stored in the main memory 100. The sprite objects 104 and background sprites 106 comprise the source material for generating the full-motion animation. The composite list of sprites for a particular animation scene is entitled a "sprite list". The method for full motion animation of the present invention utilizes a last cache limit, cache limit, and repaint index variables. To initialize the last cache limit variable for an initial scene of full-motion animation, the last cache limit is set to zero as shown in step 300. Also, the cache limit variable is set to zero as shown in step 305. In step 310, the sprite list is ordered based on the Z attributes of the sprite objects. To order the sprite list, the sprite object comprising the largest Z attribute is placed first on the sprite list. The largest Z attribute represents that the sprite object contains the greatest depth dimension. Similarly, all sprite objects are ordered in a list starting with the sprite objected having the largest Z attribute and ending with the sprite object having the smallest z attribute. Typically, the sprite objects containing the background sprites reside in the top of the Z ordered sprite list.

After ordering the sprite list, sprite objects for a current scene are compared against sprite objects for a previous scene to determine which sprite objects have changed as shown in block 315. For an initial scene, all sprites objects are marked as unchanged. For subsequent scenes, the ordered sprite list for the previous scene is entitled the "previous sprite list", and the ordered sprite list for the subsequent scene is entitled the "current sprite list". To determine whether a sprite has changed, the X, Y, and Z attributes of the current sprite list are compared against the X, Y and Z attributes of the previous sprite list. If a sprite object contained on the current sprite list does not reside on the previous sprite list, then the sprite object is new, and the sprite object is considered changed. If the sprite object has not changed, then the cache limit is incremented as shown in step 320. For each sprite object that has not changed, the cache limit is incremented as shown in a loop comprising steps 315 and 320. If a sprite object changes, then the cache limit is compared against the last cache limit as shown in step 325. If the cache limit is less than the last cache limit, then the repaint index variable is set to zero as shown in step 345. If the cache limit is greater than the last cache limit, then the repaint index variable is set to equal the last cache limit as shown in steps 335 and 350. Furthermore, if the cache limit is equal to the last cache limit, then the repaint index is not set. As shown in step 360, the last cache limit is set to the value of the cache limit.

Figure 3B:
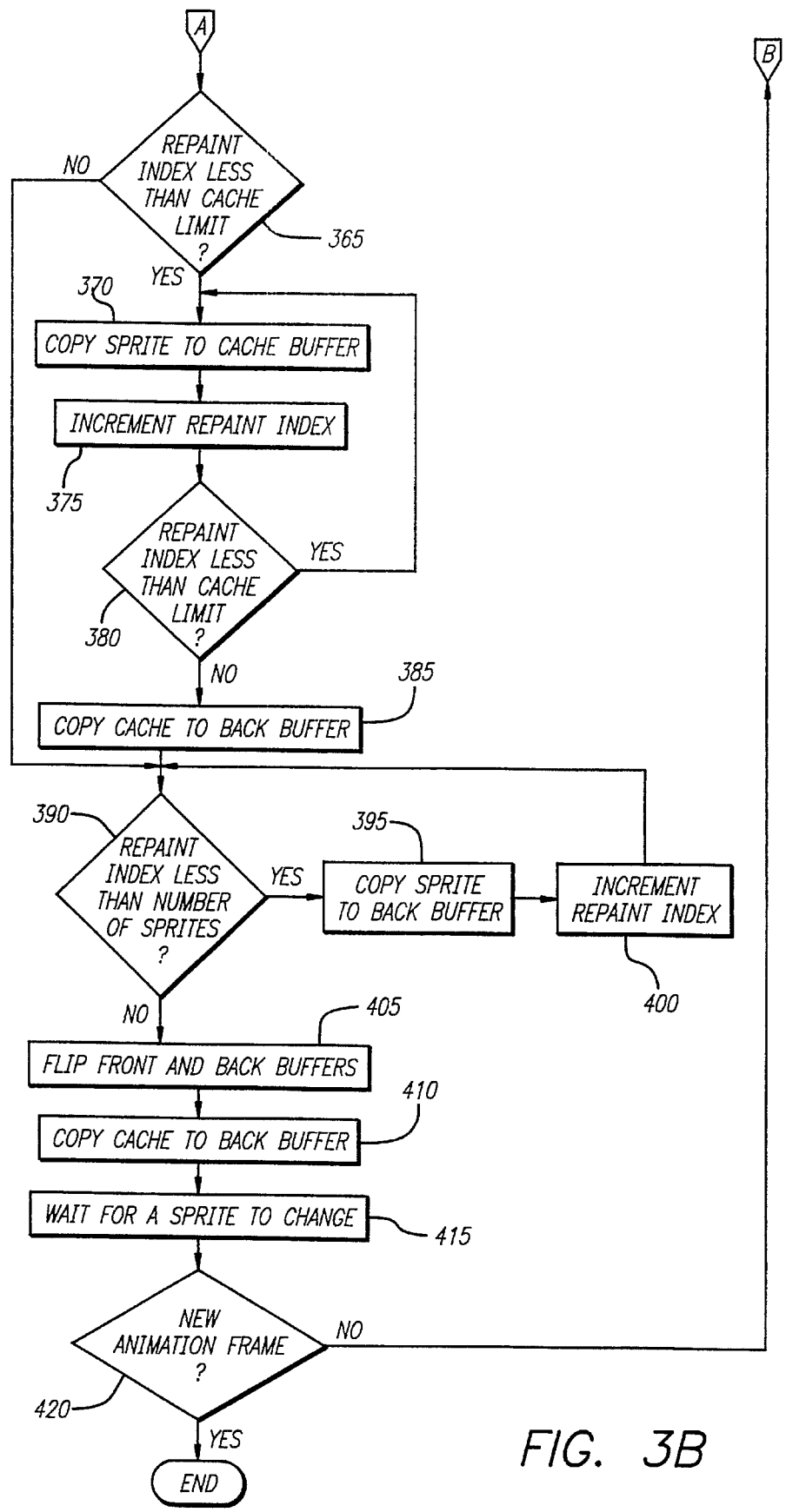

Referring to FIG. 3b, a continuation of the flow diagram of FIG. 3a illustrating a method for full-motion animation configured in accordance with the present invention is shown. The repaint index variable is compared with the cache limit variable as shown in step 365. If the repaint index is less than the cache limit, then the sprite object is copied to the cache buffer as shown in step 370. Upon copying the sprite object to the cache buffer, the repaint index is incremented as shown in step 375. In step 380, the repaint index is again compared against the cache limit. If the repaint index is less than the cache limit, the sprite object is copied to the cache buffer, and the repaint index is incremented. The loop, comprising of steps 370, 375, and 380 is executed until the repaint index is equal to the cache limit. When this occurs, the contents of the cache buffer are copied to the back buffer as shown in step 385.

In step 365, if the repaint index is greater than or equal to the cache limit, then the repaint index is compared against the number of sprites contained in the current sprite list as shown in step 390. This comparison is also made after the contents of the cache buffer are copied to the back buffer in step 385. If the repaint index is less than the number of sprites contained on the current sprite list, the next sprite object on the current sprite list is copied to the back buffer as shown in step 395. In step 400, the repaint index is incremented. Again, the repaint index is compared with the number of sprite objects on the current sprite list, and if the repaint index is less than the number of sprites, the next sprite object on the current sprite list is copied to the back buffer, and the repaint index is incremented. The loop comprising of steps 390, 395, and 400 are executed until the repaint index is equal to the number of sprites. When this occurs, the front and back buffers are reversed so that the current scene is stored in the front buffer for display on the output display as shown in step 405. The contents of the cache buffer are copied to the back buffer as shown in step 410. In step 415, the method waits for a sprite to change, thereby indicating the generation of a new scene for the full-motion animation video. The cache limit variable is set to zero, and the method is executed for a subsequent scene.

The methods and apparatus of the present invention permit display of full-motion animation by taking advantage of the way in which animated is generated. Typically, an animation scene comprises a general background scene. In addition, the animation image contains objects displayed on top of the general background scene. The objects are the characters that move to create the animation. Therefore, to create a typical animation sequence, the objects are moved relative to the background scene. Consequently, for a full-motion animation sequence consisting of a number of frames, the background sprites do not move very often.

The methods and apparatus of the present invention are most effective when conditions occur that do not require painting of a new cache buffer. If the background sprites do not change for several animation frames, then the background sprites stored in the cache buffer remain valid. Therefore, based on this general operation of animation, the present invention stores more elements in the cache buffer that do not typically move. If the sprite objects having large Z attributes for display in the background portion of the frame do not move, then those sprite objects do not require painting to either the cache or back buffers. Instead, the sprite objects stored in the cache buffer are fast copied to the back buffer. In a preferred embodiment, a special VRAM is utilized to facilitate the fast copy between the cache buffer and the back buffer. For a further description of the fast copy between special VRAMs, see, U.S. patent application, Ser. No.08/106,281, filed by Forrest, et al. on Aug. 13, 1993, entitled "Method and Apparatus for Constructing a Frame Buffer with a Fast Copy Means", and assigned to the assignee of the present invention, FirstPerson, Inc., Mountain View, Calif.

Figure 4A:
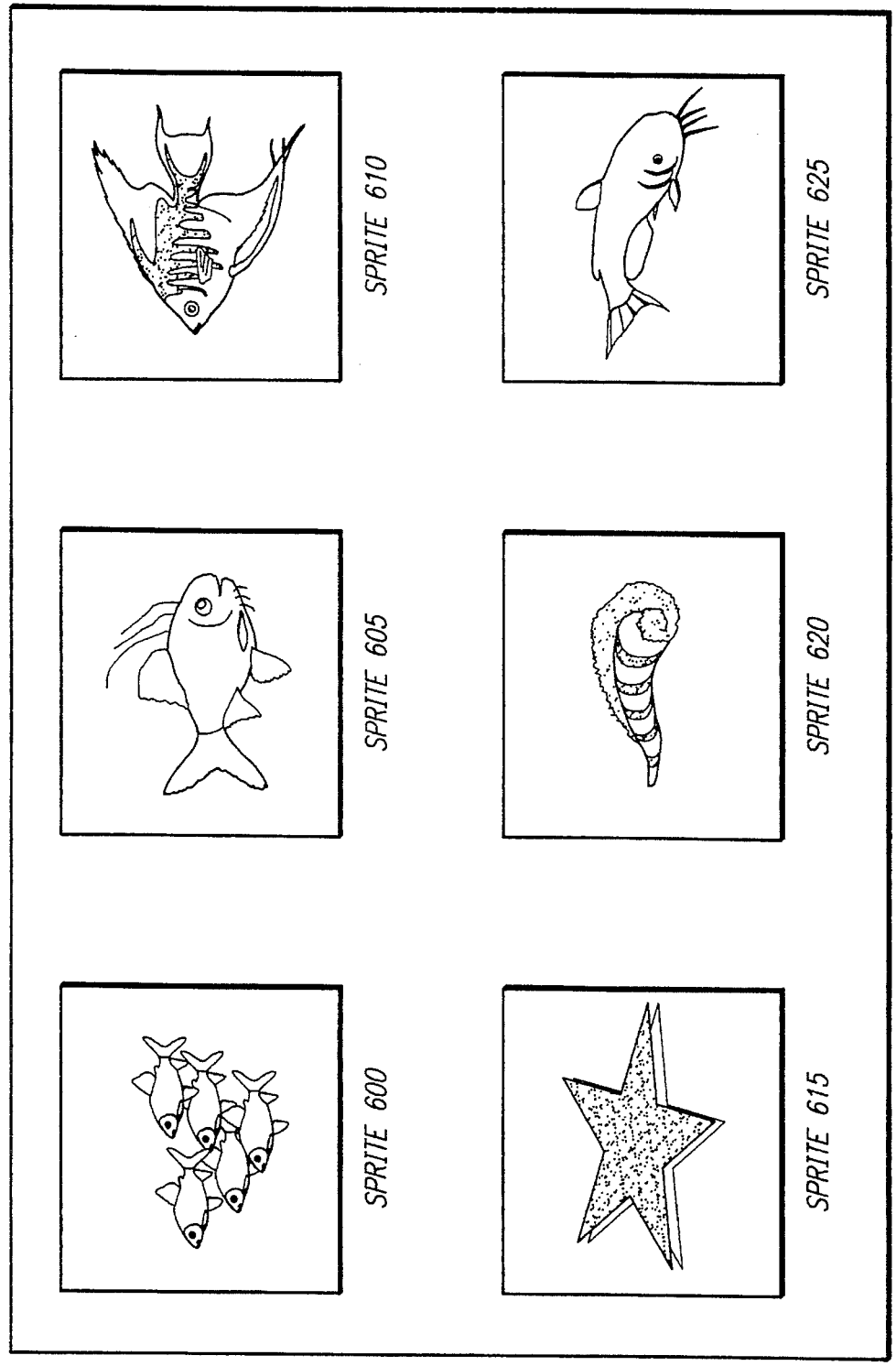
FIGS. 4a–4e illustrate graphical depictions of a plurality of sprite objects residing in memory for an animation sequence example configured in accordance with the present invention.

The present invention will now be further described by way of an example. The example is an animation program which depicts movement of a number of fish in an underwater environment. Referring to FIG. 4a, a graphical depiction of a plurality of sprite objects residing in memory are illustrated for the fish animation sequence. FIG. 4a illustrates graphical representations of sprite objects stored in memory for purposes of description only, and one skilled in the art will appreciate that a plurality of bits are actually stored in memory for each sprite object. For the fish animation example, six sprite objects, including sprite objects 600, 605, 610, 615, 620, and 625 are stored in memory and used for animation. Each sprite object comprises X, Y and Z coordinates identifying an initial location for display on the output display.

Figure 4B:
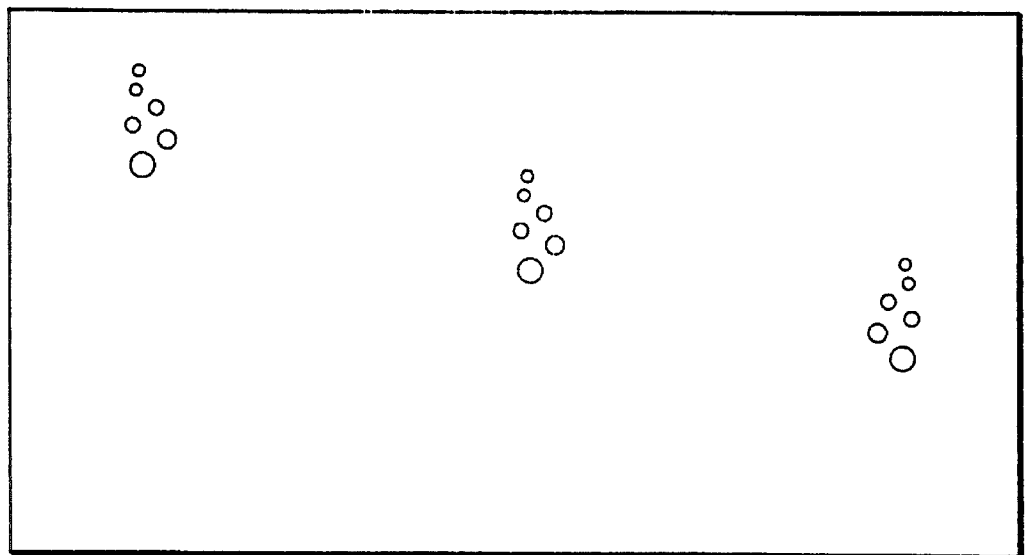
Figure 4C:
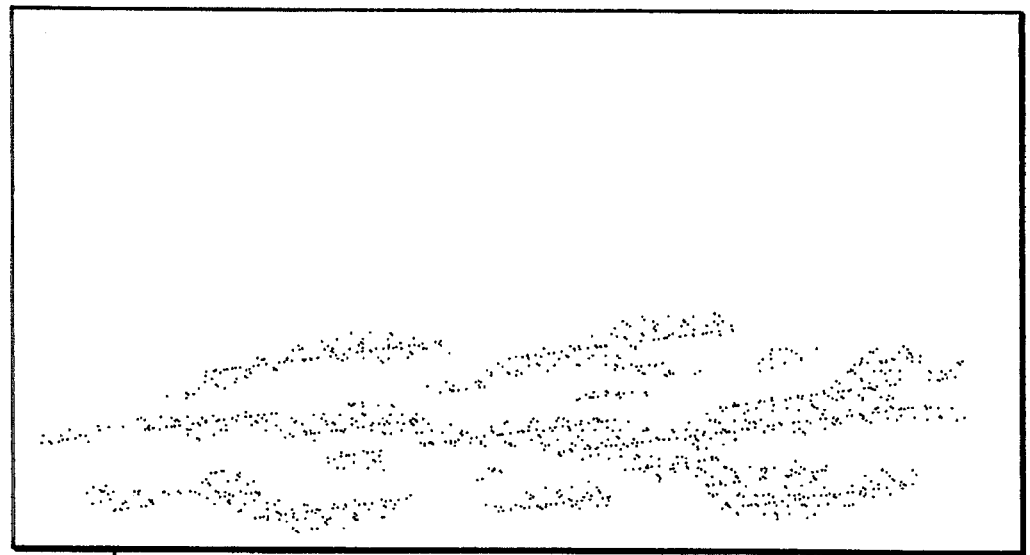
Figure 4D:
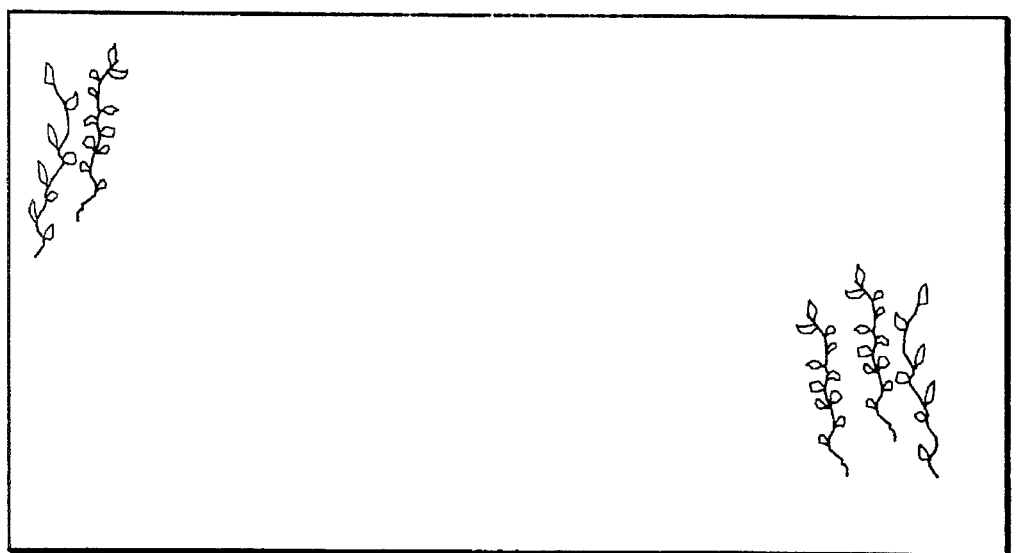
Figure 4E:
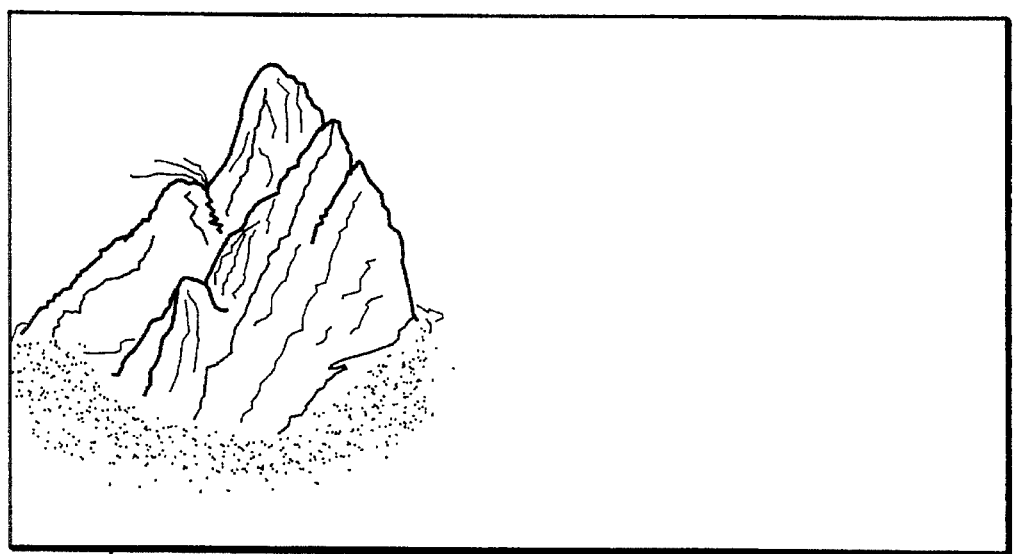

Referring to FIGS. 4b–4e, a plurality of sprite objects containing background scenery images for the fish animation sequence are illustrated. For the fish animation example, four sprite objects, containing background scenery, including sprite objects 630, 635, 640, and 645 are stored in memory. For the fish animation example, the background sprites merely provide background scenery and do not move. Although the background sprites are stable for the present example, the present invention supports movement of the large sprite objects such as background sprites. The sprite objects containing the background sprites store X, Y and Z coordinates identifying positions for illumination of pixels on the output display. The sprite objects illustrated in FIGS. 4b–4e are ordered according to the Z attribute such that sprite object 630, illustrated in FIG. 4b, contains the largest Z attribute, and sprite object 645, illustrated in FIG. 4e, contains the smallest Z attribute. The sprite object 645 illustrated in FIG. 4e illustrates a shipwreck; the sprite object 640 illustrated in FIG. 4d is sea vegetation background; the sprite object 635 illustrated in FIG. 4c is a sea floor background; the sprite object 630 illustrated in FIG. 4b is a water background.

Figure 6A:
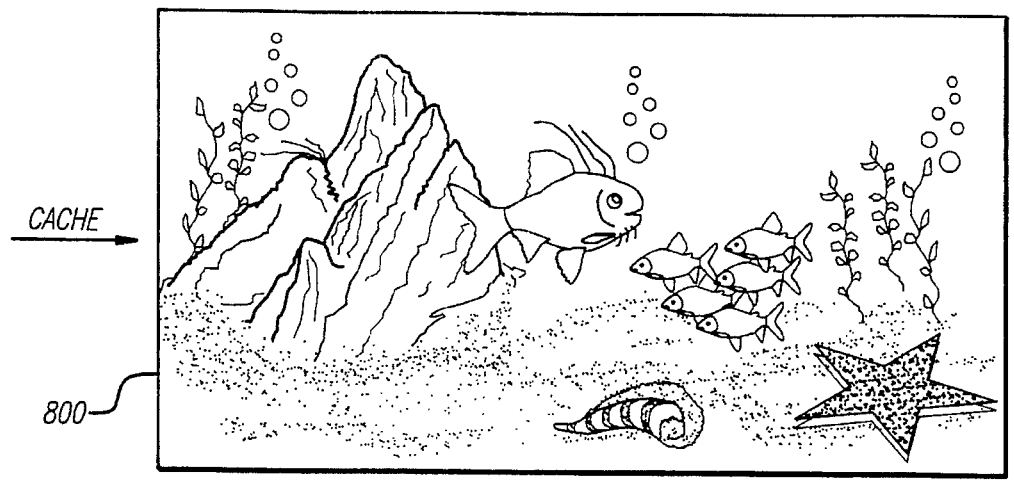
FIGS. 6a–6c illustrate a graphical representation of pixel data for a second scene of an animation sequence example configured in accordance with the present invention.
Figure 7A:
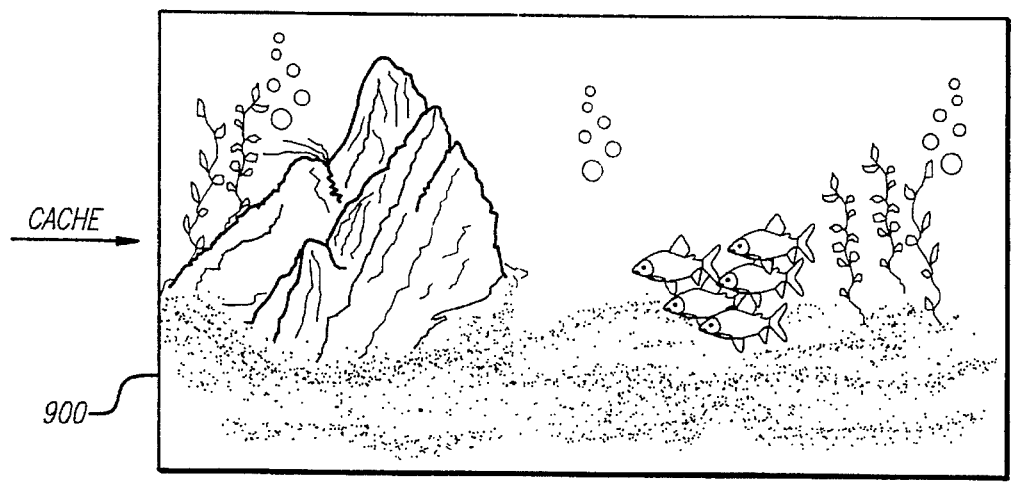
FIGS. 7a–7c illustrate a graphical representation of pixel data for a third scene of an animation sequence example configured in accordance with the present invention.
Figure 7B:
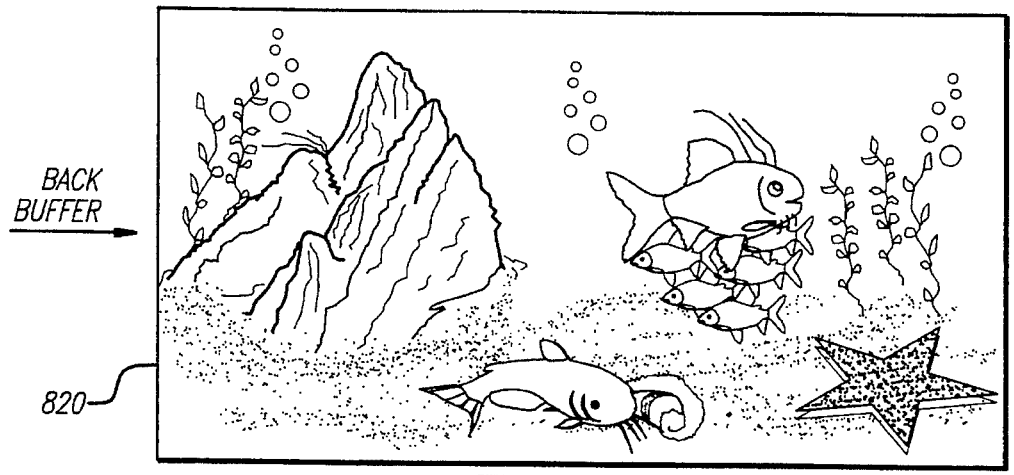
Figure 7C:
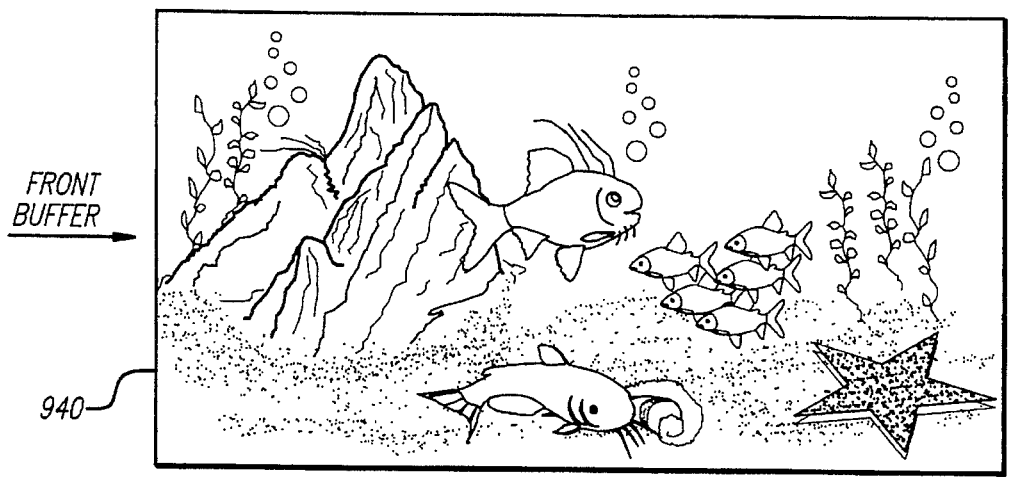

Referring to FIGS. 7a–7c, a graphical representation of pixel data for an initial scene of the fish animation sequence configured in accordance with the present invention is illustrated. As discussed above in conjunction with the flow diagram of FIG. 3, an initial scene is painted to the cache buffer. In the current example, the sprite object 630 containing the water background is painted first, the sprite object 635 containing the sea floor is painted second, the sprite object 640 containing the sea vegetation is painted third, and the sprite object 645 containing the shipwreck is painted fourth. Similarly, the sprite objects illustrated in FIG. 6a are painted starting with the sprite object comprising the largest Z attribute value.

Referring to Table 1, a sprite list is ordered based on the Z priority for each sprite object for the fish animation example. After the sprite objects 630, 635, 640 and 645 containing background scenes are painted, the sprite object 600 is next on the Z ordered sprite list. Therefore, the sprite object 600 contains the greatest depth dimension for the fish sprite objects. The sprite object 605, being next in the Z ordered sprite list, has a depth dimension less than the sprite object 600. Similarly, sprite objects 615, 620 and 625 are also contained on the sprite list for the initial scene. Because all sprites are considered changed in the initial scene, the sprite objects contained on the initial sprite list are painted to a back buffer 720 in the Z order.

Figure 5A:
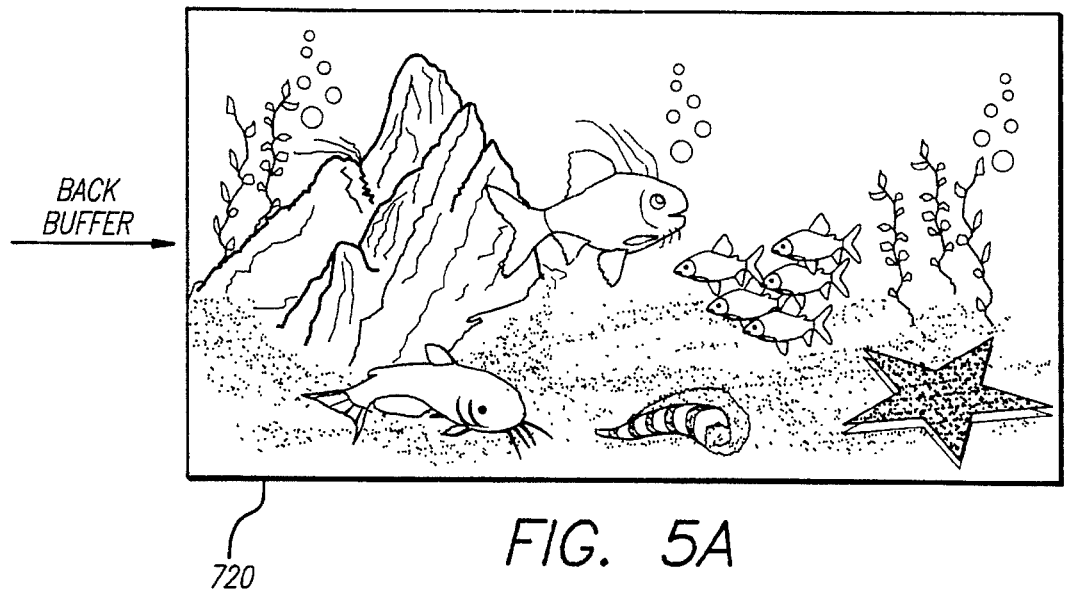
FIGS. 5a–5b illustrate a graphical representation of pixel data for an initial scene of an animation sequence example configured in accordance with the present invention.
Figure 5B:
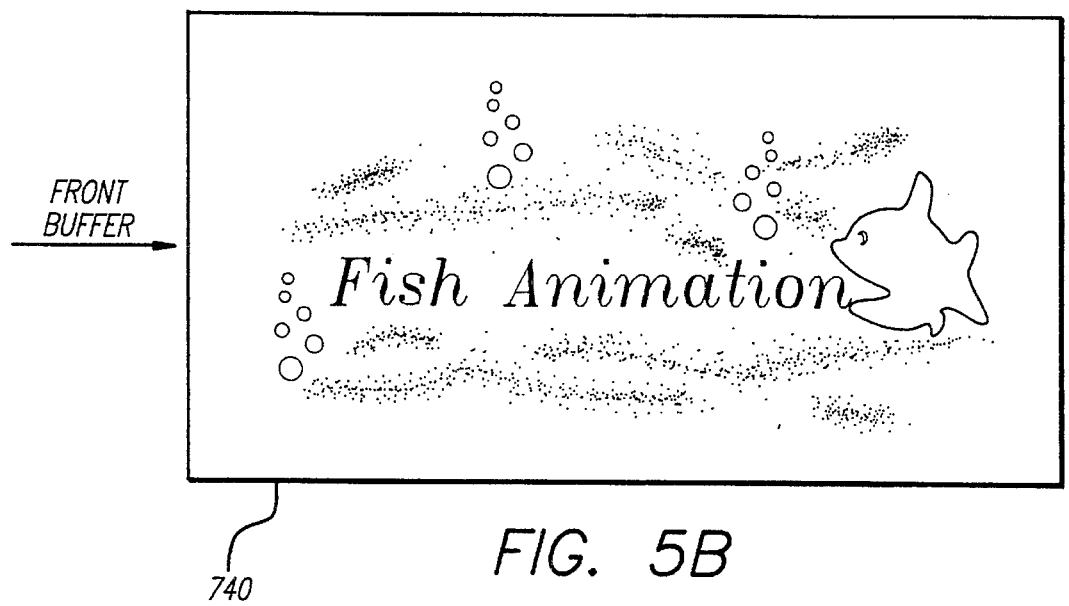

FIG. 5a graphically illustrates the contents of the back buffer 720 after painting the Z ordered sprite list of Table 1. For the initial scene, the cache buffer remains empty. FIG. 5b illustrates a screen logo, initially contained in a front buffer 740, displayed on the output display before initiation of the fish animation sequence. To display the first scene stored in the back buffer 720, the DAC is programmed so as to flip the front buffer 740 and the back buffer 720.

TABLE 1

| Sprite List Z Order | Stored in Cache |
| --- | --- |
| Sprite 630 | |
| Sprite 635 | |
| Sprite 640 | |
| Sprite 645 | |
| Sprite 600 | |
| Sprite 605 | |
| Sprite 615 | |
| Sprite 620 | |
| Sprite 625 | |

In order to display a second scene for the fish animation sequence, the sprite list of Table 1 is labeled the previous sprite list and a current sprite list for the second scene is generated. Referring to Table 2, a Z ordered sprite list for the second scene in the fish animation example is shown. In addition to the Z ordered sprite list for the second scene, Table 2 identifies the sprite objects that moved in the second scene in relationship to the first scene. In the second scene, the sprite object 625 has changed position. As illustrated in the flow diagram of FIG. 3, the current sprite list is ordered based on the Z attributes of the sprite objects. For each sprite object compared, the cache limit is incremented. When sprite object 625 from the current sprite list is compared with the sprite object 625 of the previous sprite list, a determination that the sprite object 625 has moved is made. The background scene sprite objects 630, 635, 640 and 645 did not move, and consequently the sprite objects 630, 635, 640 and 645 are painted to a cache buffer 800. The sprite object 600 has not changed from the previous Z ordered sprite list, and consequently, the sprite object 600 is painted to the cache buffer. Similarly, sprite objects 605, 615 and 620 are also painted to the cache buffer. Based on the comparison, the cache limit, now set to the last cache limit, equals 8. The cache buffer 800 is copied to a back buffer 820, and the sprite object 625 is painted onto the back buffer 820. The back buffer 820 is flipped with a front buffer 840 to display the second scene.

TABLE 2

| Sprite List Z Order | Sprite Changed | Stored in Cache |
| --- | --- | --- |
| Sprite 630 | Not Changed | Sprite 630 |
| Sprite 635 | Not Changed | Sprite 635 |
| Sprite 640 | Not Changed | Sprite 640 |
| Sprite 645 | Not Changed | Sprite 645 |
| Sprite 600 | Not Changed | Sprite 600 |
| Sprite 605 | Not Changed | Sprite 605 |
| Sprite 615 | Not Changed | Sprite 615 |
| Sprite 620 | Not Changed | Sprite 620 |
| Sprite 625 | Changed | |

Figure 6B:
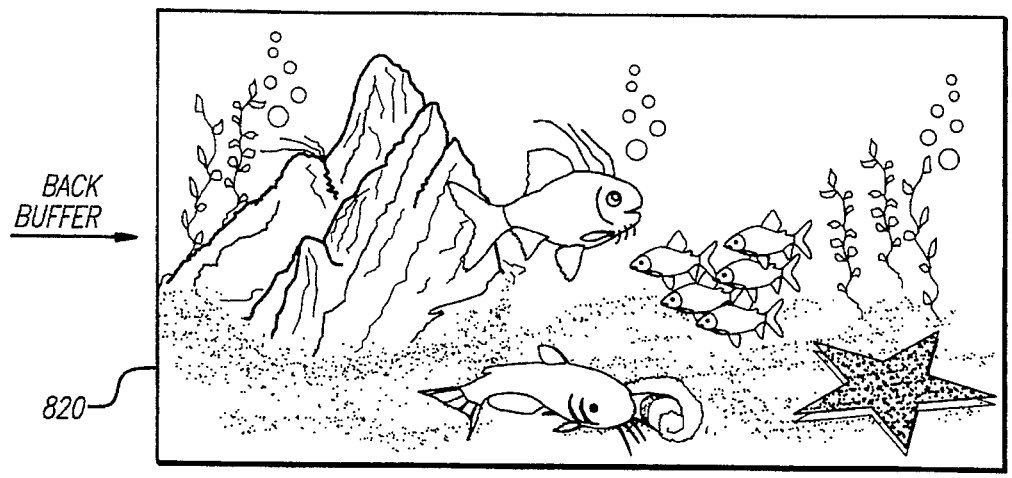
Figure 6C:
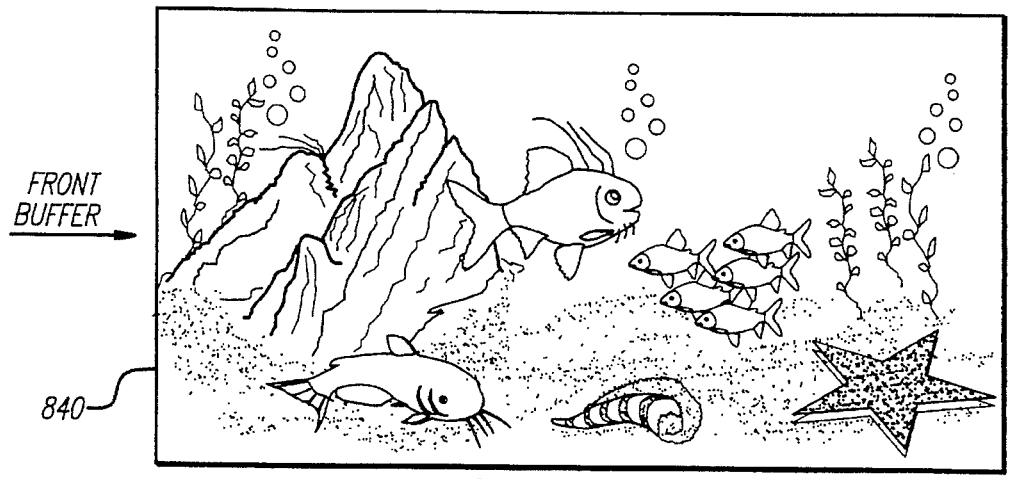

Referring to FIG. 6a, a graphical depiction of the contents of the cache buffer 800 after generation of the second scene for the fish animation sequence is illustrated. Note that the cache buffer 800 in FIG. 6a does not contain the sprite object 625. Referring to FIG. 6b, a graphical depiction of the contents of the back buffer 820 containing the second scene for the fish animation sequence is illustrated. Note that the sprite object 625 has moved to cover a portion of the sprite object 620. In FIG. 6c, the front buffer 840 containing the initial scene for the fish animation sequence is illustrated. The movement of the sprite object 625 from the first scene to the second scene is larger than generally made in a full-motion animation sequence. However, the larger displacement is made for purposes of illustration and explanation.

In order to generate a third scene for the animation sequence, the sprite list for the second scene is labeled the previous sprite list, and a sprite list for the third scene is generated. The Z ordered sprite list for the third scene is shown in Table 3. For the third scene, the sprite objects 605 and 615 have changed position. To generate the third scene, the cache limit is cleared, and the current sprite list is ordered according to Z attributes. The sprite objects 630, 635, 640, 645 and 600 have not changed position. The sprite objects 630, 635, 640, 645 and 600 are already contained in the cache buffer 800, and therefore the cache limit is incremented for each sprite object. When sprite object 605 in the current sprite list is compared with sprite object 605 in the previous sprite list, it is determined that the sprite object 605 has changed position. The last cache limit, set at 8, is compared with the cache limit which is now set at 5. Because the last cache limit is greater than the value of the cache limit when a sprite object change is encountered, the contents in the cache buffer 800 are no longer valid. Once the contents in the cache buffer 800 are no longer valid, the cache buffer must be refilled. To refill the cache buffer, the background sprite objects 630, 635, 640 and 645 and the fish sprite object 600 are painted to the cache buffer 900. The last cache limit is set to a new value of 5. The new contents of the cache buffer 900 are copied to the back buffer 920. The sprite object 605 is painted to the back buffer 920. Similarly, the sprite objects 615, 620 and 625 are painted to the back buffer.

TABLE 3

| Sprite List Z Order | Sprite Changed | Stored in Cache |
| --- | --- | --- |
| Sprite 630 | Not Changed | Sprite 630 |
| Sprite 635 | Not Changed | Sprite 635 |
| Sprite 640 | Not Changed | Sprite 640 |
| Sprite 645 | Not Changed | Sprite 645 |
| Sprite 600 | Not Changed | Sprite 600 |
| Sprite 605 | Changed | |
| Sprite 615 | Changed | |
| Sprite 620 | Not Changed | |
| Sprite 625 | Not Changed | |

Referring to FIG. 7a, a graphical depiction of the contents of the cache buffer 900 after generation of the third scene is illustrated. The cache buffer 900 contains the background sprite objects 630, 635, 640 and 645, and the fish sprite object 600. In FIG. 7b, a graphical depiction of the contents of the back buffer 920 containing the third scene for the fish animation sequence is illustrated. Note that the back buffer 920 contains sprite objects 605 and 615 in new positions. In FIG. 7c, a graphical depiction of the contents of the front buffer 940 containing the second scene of the fish animation sequence is illustrated. Upon generation of the third scene in the back buffer, the front buffer 940 and the back buffer 920 are flipped so as to display the third scene on the output display. In order to generate a fourth scene for the animation sequence, the sprite list from the third scene is labeled as the previous sprite list, and a sprite list for the fourth scene is generated. Referring to Table 4, a Z ordered sprite list for the fourth scene is shown. In the fourth scene, all sprite objects contained on the previous sprite list are not changed. However, a new sprite object 610 is added. In order to generate the fourth scene, the sprite objects are ordered based on the Z attributes as shown in Table 4. Upon comparison of the sprite objects 630, 635, 640, 645, 600 and 605 from the current sprite list to the previous sprite list, it is determined that sprite objects 630, 635, 640, 645, 600 and 605 have not changed.

Because the sprite objects 630, 635, 640, 645, and 600 are already contained in the cache buffer 900, only the cache limit is incremented for each sprite object. The sprite object 605 has also not changed. However, sprite object 605 is not contained in the cache buffer 900. Therefore, the sprite object 605 is painted into the cache buffer, and the cache limit is incremented. Upon comparing the current sprite list with the previous sprite list, it is determined that the sprite object 610 is a new sprite object. As discussed above, a new sprite object is considered as changed. At this point, the cache limit is set at 6, and the last cache limit is equal to 5. Because the cache limit is greater than the last cache limit, the contents of the cache buffer are copied to the back buffer. Subsequently, the new sprite object 610 and sprite objects 615, 620 and 625 are copied in a back buffer 1020.

TABLE 4

| Sprite List Z Order | Sprite Changed | Stored in Cache |
| --- | --- | --- |
| Sprite 630 | Not Changed | Sprite 630 |
| Sprite 635 | Not Changed | Sprite 635 |
| Sprite 640 | Not Changed | Sprite 640 |
| Sprite 645 | Not Changed | Sprite 645 |
| Sprite 600 | Not Changed | Sprite 600 |
| Sprite 605 | Not Changed | Sprite 605 |
| Sprite 610 | Changed | |
| Sprite 615 | Not Changed | |
| Sprite 620 | Not Changed | |
| Sprite 625 | Changed | |

Figure 8A:
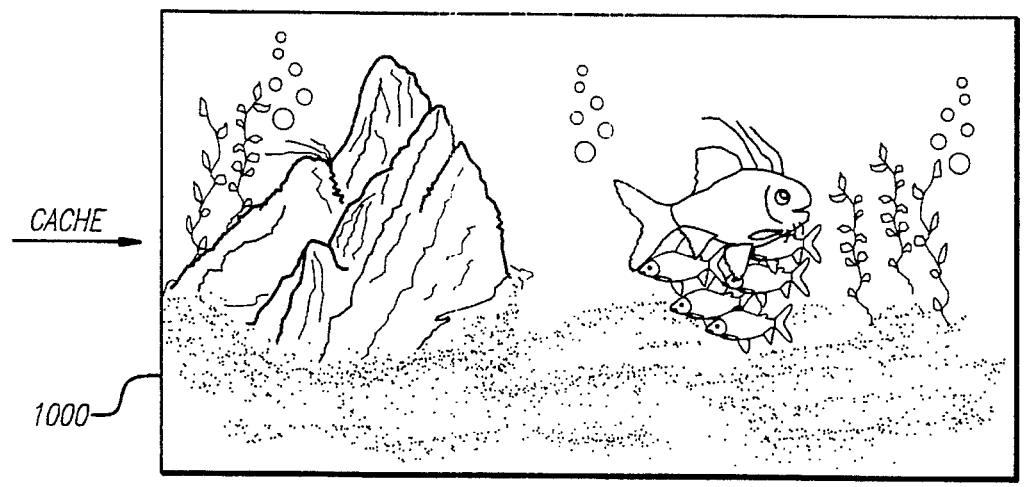
FIGS. 8a–8c illustrate a graphical representation of pixel data for a fourth scene of an animation sequence example configured in accordance with the present invention.
Figure 8B:
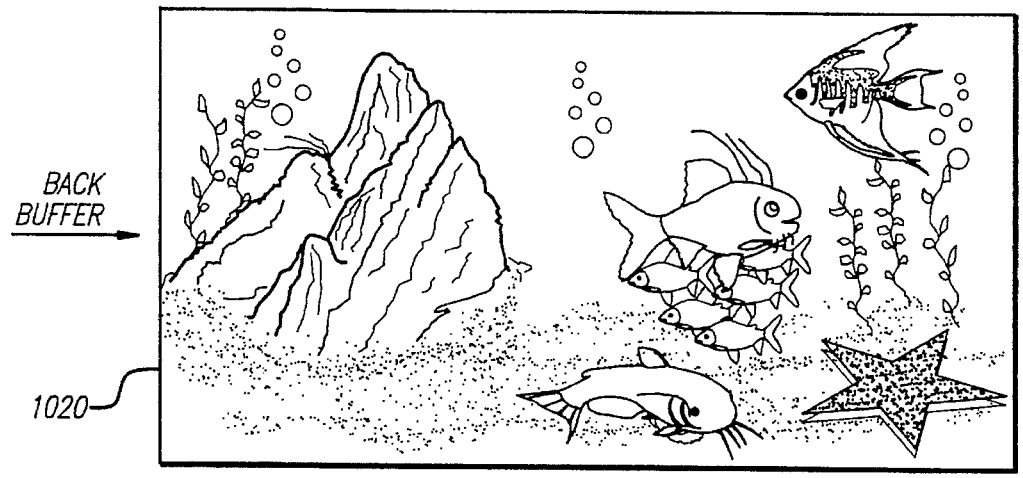
Figure 8C:
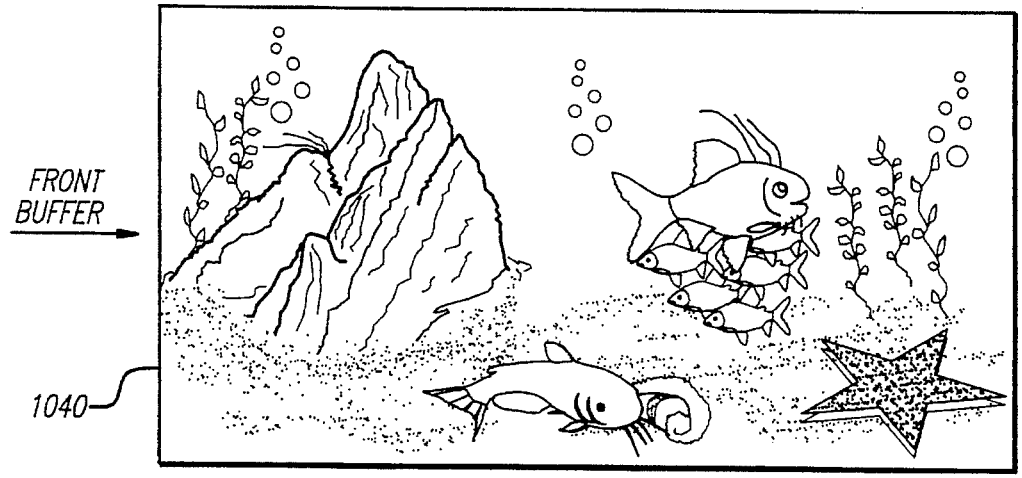

Referring to FIG. 8a, a graphical depiction of the contents of the cache buffer after generation of the fourth scene is illustrated. The cache buffer 1000 contains the background sprite objects 630, 636, 640 and 646 and the fish sprite objects 600 and 605. Referring to FIG. 8b, a graphical depiction of the contents of the back buffer 1020 after generation of the fourth scene is illustrated. Note that the back buffer 1020 contains the new sprite object 610, and the sprite object 625 is in a new location. Referring to FIG. 8c, a graphical depiction of the contents of the third scene reside within the front buffer. After generation of the fourth scene of the back buffer, the front and the back buffers are switched such that the contents of the back buffer are displayed on the output display device.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. In a computer system comprising a central processing unit (CPU), memory and an output display, said memory including a back buffer, cache buffer and front buffer, a method for displaying full-motion animation on said output display comprising the steps of:

a. generating a sprite list for each scene of said animation comprising a plurality of sprite objects, each of said sprite objects comprising horizontal, vertical, and depth attributes for display on said output display;

b. ordering said sprite objects on each sprite list based on said depth attribute;

c. comparing said sprite objects in a previously displayed scene with sprite objects in a current scene to determine whether any sprite objects have changed;

d. updating said cache buffer to contain all sprite objects that have not changed from said previously displayed scene to said current frame and have a higher depth attribute than any sprite object that has changed, said updating step comprising:

adding a sprite object from said current scene to said cache buffer when no sprites having a higher depth attribute have changed and said sprite object is not located in said cache buffer; and removing a sprite object from said cache buffer when a sprite object, stored in said cache buffer, has changed in said current frame by repainting sprite objects to said cache buffer in said current sprite list order up to said sprite object that has changed;

e. copying said sprite objects stored in said cache buffer to said back buffer;

f. adding sprite objects to said back buffer, in said current sprite list order, when sprite objects identified on said current sprite list are not located in said cache buffer; and g. switching said back buffer and said front buffer such that sprite objects for said current frame are displayed on said output display device.

2. The method for full-motion animation as claimed in claim 1 wherein said back buffer and front buffer are implemented with video random access memory (VRAM) and said cache buffer is implemented with dynamic random access memory (DRAM).

3. The method for full-motion animation as claimed in claim 1 wherein said back buffer, said front buffer and said cache buffer are implemented with video random access memory (VRAM).

4. The method for full-motion animation as claimed in claim 1 wherein each frame of said full-motion animation is displayed at 30 frames per second.

5. The method for full-motion animation as claimed in claim 1 wherein said sprite objects are displayed in a National Television Standards Committee (NTSC) video format.

6. An apparatus for displaying full-motion animation on said output display comprising:

a cache buffer; a back buffer for storing an animation scene prior to display; a front buffer coupled to said output display for storing an animation scene being rendered on said output display;

a sprite list generator element for generating a sprite list for each scene of said animation comprising a plurality of sprite objects, each of said sprite objects comprising horizontal, vertical, and depth attributes for display on said output display, sprite list generation means ordering said sprite objects on each sprite list based on said depth attribute;

a comparator element for comparing said sprite objects in a previously displayed scene with sprite objects in a current scene to determine whether any sprite objects have changed;

a cache buffer updating element coupled to said comparator element and said cache buffer for storing all sprite objects that have not changed from said previously displayed scene to said current scene and have a higher depth attribute than any sprite object that has changed, said cache buffer updating element comprising:

an adding element for adding a sprite object from said current scene to said cache buffer when no sprites having a higher depth attribute have changed and said sprite object is not located in said cache buffer; and a removal element for removing a sprite object from said cache buffer when a sprite object, stored in said cache buffer, has changed in said current frame by repainting sprite objects to said cache buffer in said current sprite list order up to said sprite object that has changed;

a copy element for copying said sprite objects stored in said cache buffer to said back buffer, said copy element adding sprite objects to said back buffer, in said current sprite list order, when sprite objects identified on said current sprite list are not located in said cache buffer; and a switching element coupled to said front and back buffers for switching said back buffer and said front buffer such that sprite objects for said current frame are displayed on said output display device.

7. The apparatus for full-motion animation as claimed in claim 6 wherein said back buffer and front buffer comprise video random access memory (VRAM) and said cache buffer comprises dynamic random access memory (DRAM).

8. The apparatus for full-motion animation as claimed in claim 6 wherein said back buffer, said front buffer and said cache buffer comprise video random access memory (VRAM).

9. The apparatus for full-motion animation as claimed in claim 6 wherein each frame of said full-motion animation is displayed at 30 frames per second.

10. The apparatus for full-motion animation as claimed in claim 6 wherein said sprite objects are displayed in a National Television Standards Committee (NTSC) video format.

* * * * *